United States Patent
Pawlik et al.

(10) Patent No.: US 10,219,047 B1
(45) Date of Patent: Feb. 26, 2019

(54) MEDIA CONTENT MATCHING USING CONTEXTUAL INFORMATION

(71) Applicant: Google Inc., Mountain View, CA (US)

(72) Inventors: Arkadiusz Pawlik, Ruschlikon (CH); David Rosenstein, Burlingame, CA (US); Fabio Magagna, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/457,979

(22) Filed: Mar. 13, 2017

(51) Int. Cl.
*H04N 21/45* (2011.01)
*H04N 21/84* (2011.01)
*H04N 21/258* (2011.01)
*H04N 21/442* (2011.01)
*H04N 21/6543* (2011.01)

(52) U.S. Cl.
CPC ........... *H04N 21/84* (2013.01); *H04N 21/258* (2013.01); *H04N 21/442* (2013.01); *H04N 21/4508* (2013.01); *H04N 21/6543* (2013.01)

(58) Field of Classification Search
CPC ......... H04N 21/2743; H04N 21/23418; H04N 21/256; H04N 21/442; H04N 21/44204; H04N 21/4508; H04N 21/4627; H04N 21/6543; H04N 21/8358; H04N 21/84; H04N 21/8456; G06F 17/30038; G06F 17/30598
See application file for complete search history.

(56) References Cited

U.S. PATENT DOCUMENTS

| | | | | |
|---|---|---|---|---|
| 9,471,663 B1* | 10/2016 | Granstrom | ........ | G06F 17/30598 |
| 2008/0059536 A1* | 3/2008 | Brock | ...................... | G06F 21/10 |
| 2010/0263020 A1* | 10/2010 | Harrison | ........... | G06F 17/30017 726/1 |
| 2010/0287201 A1* | 11/2010 | Damstra | ............ | H04N 21/2541 707/780 |
| 2012/0124638 A1* | 5/2012 | King | .................... | H04N 21/233 726/1 |
| 2015/0026078 A1* | 1/2015 | Weich | ..................... | G06F 21/31 705/310 |
| 2016/0301966 A1* | 10/2016 | Hoder | .............. | H04N 21/23418 |

\* cited by examiner

*Primary Examiner* — Hai V Tran
(74) *Attorney, Agent, or Firm* — Lowenstein Sandler LLP

(57) ABSTRACT

A content hosting system determines whether or not to remove media content items that use, either in whole or in part, media content of other media content items. The media content items are uploaded or otherwise added to the system by different owners. To correctly make this determination appropriately, the content hosting system adopts a two-step process. First, for a given probe media content item, the content hosting system identifies reference media content items of which reference media content is reused in the probe media content item. Second, the content hosting system evaluates whether or not the probe media content item should be removed. To make this evaluation, the content hosting system uses contextual information such as characteristics associated with a reference media content item and the probe media content item.

20 Claims, 4 Drawing Sheets

MEDIA CONTENT MATCHING USING CONTEXTUAL INFORMATION

BACKGROUND

1. Field of Art

This description generally relates to media content processing, and more specifically to media content matching.

2. Description of the Related Art

Online systems store, index, and make available for consumption various forms of media content to Internet users. This media content may take a variety of forms; in particular, video content and audio content. Such media content is widely available across the Internet, both in fixed and streaming form. Online media systems allow users to watch media uploaded by other users. These online media systems may contain thousands or millions of media content items, making management of these media content items an extremely challenging task.

While some media content items may be identified by file names or other information provided by the user, this identification information may be incorrect or insufficient to correctly identify the media content item. An alternate approach of using humans to manually identifying media content is expensive and time consuming. Various methods have been used to automatically detect similarities between media content items based on their media content. Typically, these methods compare media content in portions and conclude that one media content item reuses media content of another media content item when portions of media content that are longer than a threshold length are determined to match, according to some criteria. However, these methods produce false positive and/or false negative identifications of media content items that reuse media content of other media content items.

SUMMARY

A content hosting system determines whether or not to flag media content items for removal that use, either in whole or in part, media content of other media content items. The media content items are uploaded or otherwise added to the system by different owners. To correctly make this determination appropriately, the content hosting system adopts a two-step process. First, for a given probe media content item, the content hosting system identifies reference media content items of which reference media content is reused in the probe media content item. Second, the content hosting system evaluates whether or not the probe media content item should be flagged for removal. To make this evaluation, the content hosting system uses contextual information such as characteristics associated with a reference media content item and the probe media content item.

In one embodiment, a method receives a pair of media content items. The pair comprises a probe media content item and a reference media content item. The probe media content item is determined to include at least a portion of reference media content of the reference media content item. The method receives metadata associated with the pair. The metadata associated with pair provides information about the probe media content item, the reference media content item, and the portion of reference media content reused in the probe media content. The method classifies the pair into a reuse group based on the metadata associated with the pair. Each of the reuse groups is associated with a threshold amount of reuse different from the other reuse groups. The threshold amount of reuse is used for determining whether or not the probe media content item should be flagged for removal. The method compares an amount of the portion of reference media content to the threshold amount of reuse associated with the reuse group into which the pair is classified. Responsive to the amount of the portion of reference media content greater than the threshold amount of reuse associated with the reuse group, the method flags the probe media content item for removal.

In one embodiment, a system includes a computer processor and a non-transitory computer-readable storage medium storing computer executable components configured to cause the computer processor to perform receiving a pair of media content items. The pair comprises a probe media content item and a reference media content item. The probe media content item is determined to include at least a portion of reference media content of the reference media content item. The computer processor performs receiving metadata associated with the pair. The metadata associated with pair provides information about the probe media content item, the reference media content item, and the portion of reference media content reused in the probe media content. The computer processor performs classifying the pair into a reuse group based on the metadata associated with the pair. Each of the reuse groups is associated with a threshold amount of reuse different from the other reuse groups. The threshold amount of reuse is used for determining whether or not the probe media content item should be flagged for removal. The computer processor performs comparing an amount of the portion of reference media content to the threshold amount of reuse associated with the reuse group into which the pair is classified. The computer processor performs, responsive to the amount of the portion of reference media content greater than the threshold amount of reuse associated with the reuse group, flagging the probe media content item for removal.

In one embodiment, a non-transitory computer-readable medium has instructions stored thereon that, in response to execution, cause a system including a processor to perform receiving a pair of media content items. The pair comprises a probe media content item and a reference media content item. The probe media content item is determined to include at least a portion of reference media content of the reference media content item. The instructions cause the system to perform receiving metadata associated with the pair. The metadata associated with pair provides information about the probe media content item, the reference media content item, and the portion of reference media content reused in the probe media content. The instructions cause the system to perform comparing an amount of the portion of reference media content to the threshold amount of reuse associated with the reuse group into which the pair is classified. The instructions cause the system to perform, responsive to the amount of the portion of reference media content greater than the threshold amount of reuse associated with the reuse group, flagging the probe media content item for removal.

In one embodiment, a system includes means for receiving a pair of media content items. The pair comprises a probe media content item and a reference media content item. The probe media content item is determined to include at least a portion of reference media content of the reference media content item. The system further includes means for receiving metadata associated with the pair. The metadata associated with pair provides information about the probe media content item, the reference media content item, and the portion of reference media content reused in the probe media content. The system further includes means for classifying the pair into a reuse group based on the metadata associated with the pair. Each of the reuse groups is associated with a threshold amount of reuse different from the other reuse groups. The threshold amount of reuse is used for determining whether or not the probe media content item should be flagged for removal. The system further includes means for comparing an amount of the portion of reference media content to the threshold amount of reuse associated with the reuse group into which the pair is classified. The system further includes means for, responsive to the amount of the portion of reference media content greater than the threshold amount of reuse associated with the reuse group, flagging the probe media content item for removal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Architecture

Figure 1:
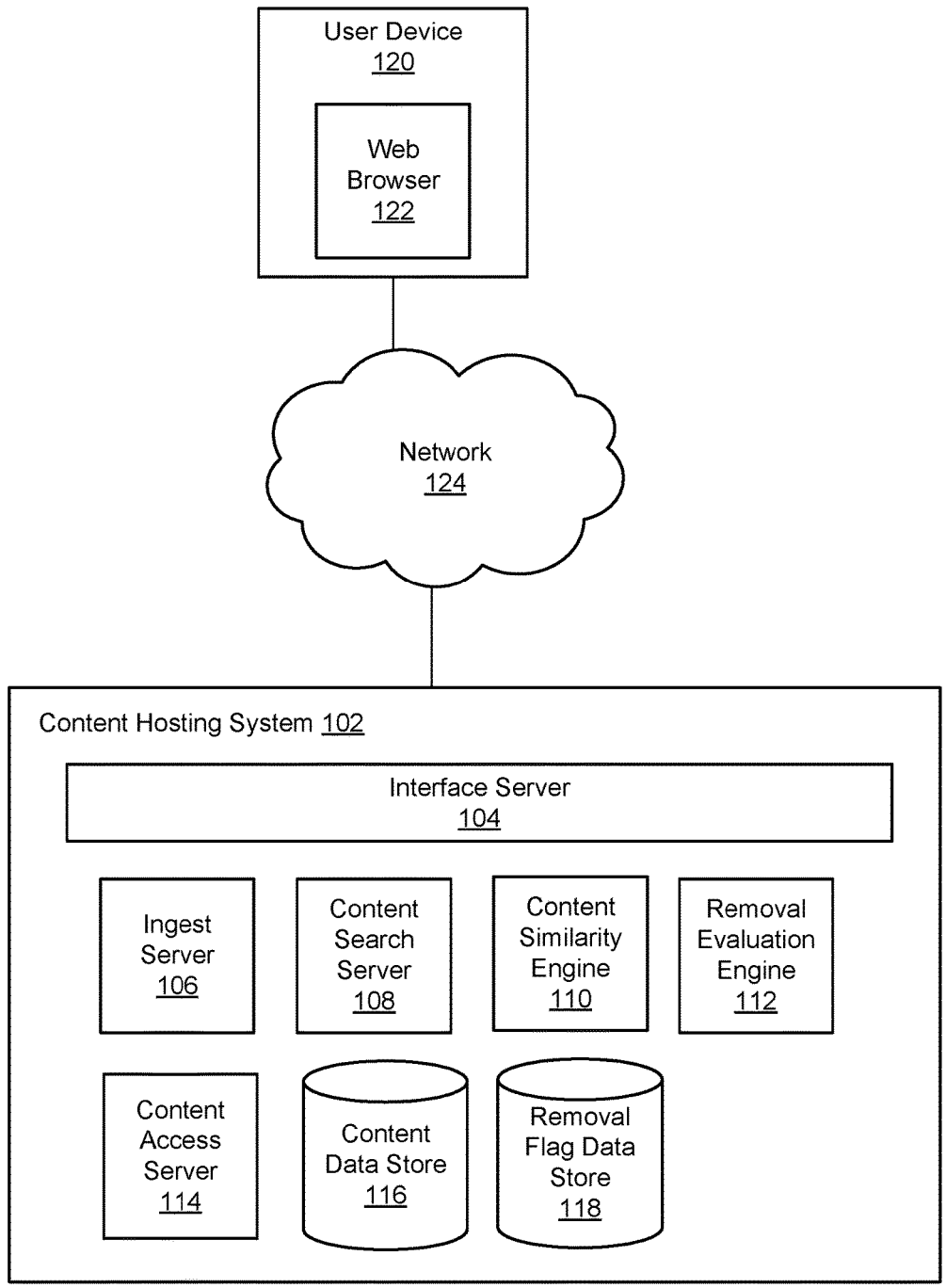
FIG. 1 is a high level block diagram of a system evaluating media content items that reuse media content of other media content items, according to one embodiment.

FIG. 1 is a high-level block diagram of a system for evaluating whether or not a media content item includes media content of one or more other media content items, according to one embodiment. Further, the content hosting system 102 can detect media content is included within other media content items, either in whole or in part, uploaded or otherwise added to the system by different owners. For a probe media content item, the content hosting system 102 identifies one or more other reference media content items each of which at least a portion of its media content is included (or "reused") in the probe media content item.

As described herein, a "probe media content item" refers to a particular media content item that is going to be analyzed for possible flagging. A "probe media content item" is also referred to hereinafter as "probe media" and "probe media content" interchangeably.

The one or more other "reference media content items" are the media content items against which the probe media content item is compared to determine whether or not to flag the probe media content item. The reference media content items can include media content that is copyright protected, owned or created by another entity, access restricted, or otherwise noteworthy. A "reference media content item" is also referred to hereinafter as "reference media" and "reference media content" interchangeably.

The content hosting system 102 evaluates whether or not to flag a probe media content item for removal based on the reference media content items. The content hosting system 120 flags a probe media content item for removal when the probe media content item reuses a "substantial" amount of reference media content. What amount of reuse constitutes a substantial amount may be a predetermined or dynamic threshold amount, set by an implementer of the content hosting system 102. Further the threshold, whether static or dynamic, may be different for different pairs of probe and reference media depending upon contextual information available for the probe and reference media. This provide the content hosting system 102 flexibility in its ability to flag different amounts of reuse for different pairs of media.

FIG. 1 illustrates a content hosting system 102 and a user device 120 connected by a network 124. A user that is an individual or an entity can use the user device 120 to access media content contained within the content hosting system 102. Throughout this description, references to a user performing some action with respect to the content hosting system 102 generally assume that the user is performing such action using a user device 120, and it is the user device 120 that is communicating with the content hosting system 102. To simplify and clarify the present description, the media files received and shared by the content hosting system 102 are generally referred to as media, content item, or media content items that include media content such as video content and/or audio content. It should be understood that the content hosting system 102 can receive and share media content of any type such as 360 degree videos, 2D videos, 3D videos, virtual or augmented reality content, music, podcasts, audio books, documents, multimedia presentations, and the like.

As initial examples, a user, through a user device 120, can access a content item from the content hosting system 102 by browsing a catalog of media content items, conducting searches using keywords, reviewing play lists from other users or the system administrator (e.g., collections of videos forming channels), or playing media content items associated with particular user groups (e.g., communities). The content hosting system 102 may also be configured to receive media content items for storage in order to enable the sharing of the media content with other users.

The user device 120 communicates with the content hosting system 102 over the network 124. In one embodiment, the user device 120 is a personal computer or a mobile device (e.g., a smartphone or tablet computer) executing a web browser 122 that allows a user to access web pages and media content provided by the content hosting system 102. In another embodiment, the user device 120 is a personal computer or a mobile device that executes a software application ("app") providing specific functionality for accessing the content hosting system 102. The user device 120 may also be another network-capable device such as a car entertainment system, television "set-top box," gaming console, etc. Although FIG. 1 illustrates only a single user device 120, it should be understood that many user devices (e.g., millions) can communicate with the content hosting system 102 at any time. Only one user device 120 is illustrated in order to simplify and clarify the present description.

The network 124 represents the communication pathways between the user device 120 and the content hosting system 102. In one embodiment, the network 124 is the Internet, but may also be any network, including but not limited to wired or wireless networks, cloud computing networks, private networks, virtual private networks, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the user device side in other embodiments if appropriate. In addition, the functionality attributed to a particular component can be performed by different or multiple components operating together.

In the illustrated example embodiment of FIG. 1, the content hosting system 102 comprises an interface server 104, an ingest server 106, a content search server 108, a content similarity engine 110, a similarity evaluation module 112, a content access server 114, a content data store 116, and a removal flag data store 118. However, these components and functionality they implement may vary between embodiments. Additionally, in other embodiments different components may be added or omitted, and the information communicated between components may vary. Generally, functionality described in this description may be carried out by any combination of programmed logical components residing in a computer readable storage medium for execution by a computer processor. Many conventional features, such as firewalls, load balancers, application servers, failover servers, site management tools and so forth are not shown so as not to obscure the features of the system.

The interface server 104 handles communication with the user device 120 via the network 124, and communicates appropriately with the other components of the content hosting system 102 in response to those communications. For example, the interface server 104 receives communication data from the user device 120 that includes user interactions from the user device 120 and communicates with the other servers of the content hosting system 102 in order to process the user interactions. Example user interactions include clicking on a link to a media content item, selecting a media content item for upload, typing comments, clicking on a link to make a purchase, selecting an item from a drop-down menu to fill a web-based form, and the like. User interactions include user requests such as a request to access to a media content item, a request to upload a media content item, a request to make a purchase, a request to make comments, a request to make a purchase, a request to fill a web-based form, and the like. The interface server 104 can be further configured to provide responses to user interactions. For example, the interface server 104 provides a requested media content item to the user device 120 for presentation to a user. The requested media content item can be streamed by the content hosting system 102 to the user device 120 via the interface server 104. One or more related media content items can be suggested to the user, for example, by providing links to the one or more related media content items to the user device 120 where the requested media content is playing, such that the user can select a link to play a related media content item.

The ingest server 106 processes media content items received via the network 124 from a user device 120 for uploading to the content hosting system 102. The processing of the media content item can include assigning an identifier to the newly received media content item, formatting (e.g., transcoding), compressing, metadata tagging, content analysis, and/or other data processing methods. In one embodiment, the user device 120 transmits information with the media content item transmitted to the content hosting system 102. The information (e.g., title, description, and tag information) can describe the media content item. The information can include the media type (e.g., "video" type that includes both video and audio content, "audio" type that includes only audio content, etc.) for the media content item. The information can further include icons or thumbnail views, associated metadata, such as a title, author, uploader, time stamp when it is uploaded, tags, description, comments, rating, channel, and/or value of a media content item. The ingest server 106 stores the media content item, processed or not, in a content data store 116 and stores the information as metadata of the media content item.

Other items of information may also be provided or accessed by the content hosting system 102 for inclusion in the metadata of the media content item. A categorical or numerical value of media content item can be provided by an owner of a media content item such as a creator of the media content or uploader who uploads the media content item to the content hosting system 102. The content hosting system 102 may also access or determine a reputation measure of the uploader and/or a reputation measure of a channel associated with the uploader or that is associated with the media content item. For example, an uploader may be assigned a reputation measure representing a good reputation if the uploader uploads only or mostly media content items that do not include media content of other media content items, that have never been flagged for removal, or against which no requests for removal have been filed. An uploader may also have a good reputation if the uploader uploads media content items that receive favorable outcomes in requests for removal (e.g., requests for removal are declined). An uploader may be assigned a reputation measure representing a bad reputation if the uploader uploads only or mostly media content items that have been flagged for removal, against which requests for removal have been filed, or that receive unfavorable outcome in requests for removal (e.g., requests for removal are approved). Likewise, channels (or collections) of media content items may also be associated with reputation measures. Similarly to the above, a channel may be assigned a reputation measure representing a good reputation if media content items included in the collection do not include media content of other media content items, that have never been flagged for removal, against which no requests for removal have been filed, or that receive favorable outcome in requests for removal (e.g., requests for removal are declined), and the reverse for a bad reputation as above. Reputation measures of an uploader and reputation measures of a channel can be obtained from a removal flag data store 118.

The ingest server 106 can generate metadata that includes characteristics of the media content items stored in the content data store 116. For example, the ingest server 106 can generate metadata indicating one or more of an audio component type (e.g., background music, foreground music), a genre (e.g., techno music, hip hop, classic, pop, etc.), a signal to noise ratio (SNR), a position and/or a size of visual content as displayed in a video frame, a template used to create media content if the media content is created based on a template, transformation (e.g., 2× speed, 3× speed, cropping, a filter applied, etc.) if applied, and the like. The ingest server 106 can generate metadata indicating static content, such as a background static image that stays substantially or entirely the same between frames, video frames that includes substantially or entirely static image, or blank video frames included in media content. The ingest server 106 can also generate metadata indicating a category of media content such as a speech, remix, karaoke, movie introduction, and the like. The ingest server 106 can generate metadata of a media content item simultaneously while it is being uploaded. The ingest server 106 can also generate or update metadata of a media content item at a later time after the media content item has been uploaded completely as more information is available.

The content search server 108 processes user interactions that include user requests received by the interface server 104 and identifies media content relevant to the users' requests. A user request provided by a user via the user device 120 to the interface server 104 can include a search query specifying one or more search terms. The content search server 108 can use the search term, for example, to query the metadata of media content items stored in the content data store 116. The search results are the media content items of which the associated metadata is relevant to the search term. The search results from the query are transmitted to the interface server 104, so that the search results can be presented to the user. In various embodiments, the ingest server 106 can pass received media content items directly to the content similarity engine 110 for analysis.

The content access server 114 receives from the interface server 104 requests from users that wish to view a specific media content item. The request transmitted by the user device 120 can include the identifier of the media content item the user wishes to play (which can be included automatically once the user selects the media content item to play). The content access server 114 uses the identifier to search and locate where the media content item is stored in the content data store 116. The content access server 114 provides the media content item requested to the interface server 104.

The content similarity engine 110 determines if a given probe media content item includes media content of one or more reference media content items. To determine similarity, the content similarity engine 110 analyzes and compares probe media content to reference media content.

Figure 3:
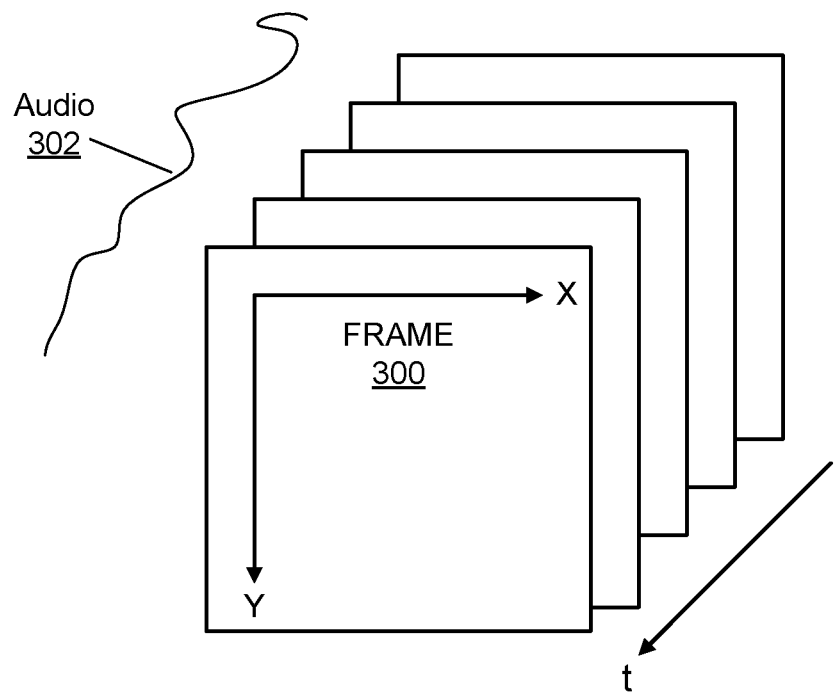
FIG. 3 illustrates an example structure for a media content item received by the content hosting system, according to one embodiment.

An example structure for a probe media received by the content similarity engine 110 is provided in FIG. 3. The probe media includes a video content including a series of video frames 300 and an audio content including an audio signal 302. Each video frame 300 comprises an image having a plurality of pixels arranged in a two-dimensional grid (for example, in an X direction and a Y direction). The series of video frames 300 are also arranged sequentially in time (the t direction). Accordingly, video content of a probe media comprises both spatial information, defined by the arrangement of pixels in the X and Y directions, and sequential or temporal information defined by how the pixels change throughout the time (t) dimension. The audio signal progresses in time (the t direction). Audio content of a probe media comprises sound information defined by pitch, duration, loudness, timbre, sonic texture, and spatial location change throughout the time (t) dimension.

The content similarity engine 110 compares probe media content to reference media content to determine whether one or more portions of one or more reference media content items are included in the probe media content. The content similarity engine 110 queries a portion of probe media content against reference media content to identify one or more portions of reference media content that match the portion of probe media content. Herein, determining the presence of match involves analyzing the video, audio, or other media data of the portions of the media content items to determine if the similarity between the characteristics of a given portion of the probe media is above a predetermined threshold with respect to a given portion of one or more of the reference media. Stated differently, a match does not need to be a completely identical match, it merely needs to be sufficiently similar according to the implementation chosen by the implementer. A variety of media matching algorithms may be used to determine whether portions of media match, and one of skill in the art will appreciate that any of these algorithms can be used.

The content similarity engine 110 determines amounts (e.g., a duration) of one or more reference media content that is included in the probe media content. The portion of reference media content identified as being included within a probe media content item is referred to hereinafter as "reused content" for clarity.

When identifying matches in media content, the content similarity engine 110 can accommodate inconsistencies (e.g., temporal, dimensional, luminance, brightness, color, tune, cropping, playback speed, etc.) between media content that can arise between two similar videos that come from different sources. Often such inconsistencies arise from differences in editing, capture, compression, transcoding, and so on as there are many possible sources of difference. For example, it is possible for the content similarity engine 110 to identify that a probe media content plays at twice speed of a reference media content, and yet is still a match to that reference media content. By accommodating these inconsistencies, the content similarity engine 110 is able to match a probe media against a wide array of reference media.

In one embodiment, the content similarity engine 110 uses fingerprints to identify matches between media content. The content similarity engine 110 creates one or more fingerprints of a probe media content item. The one or more fingerprints represent probe media content such as video and/or audio content included therein. The fingerprints can include video fingerprints and/or acoustic fingerprints. Video fingerprints can be generated based on individual video frames or shots of the probe media content item. A shot is a set of consecutive video frames. The content similarity engine 110 create shots of the probe media content item that include consecutive video frames by detecting temporal locations of discontinuities in the video content. A discontinuity can be, for example, an abrupt change such as when a video scene switches from one camera angle to another (i.e. a cut), a fade in which the shot slowly fades to black and a new shot begins, a dissolve in which a first shot slowly transitions into a second shot, or any other type of transition. Similarly, acoustic fingerprints can be generated based on audio signals of the probe media content item. After generating the one or more probe fingerprints for a probe media content item, the content similarity engine 110 stores the generated probe fingerprints associated with the probe media content item in the content data store 116. The content similarity engine 110 matches one or more probe fingerprints of a probe media content item against reference fingerprints to identify one or more reference media content items of which at least a portion of reference media content is included within the probe media content item.

For each identified reference media content item, the content similarity engine 110 determines an amount of reused content as well as information regarding how the reference media content is reused in a probe media content item. For instance, the content similarity engine 110 determines a start timestamp and an end timestamp of a portion of reused content and calculates an interval between the end and start timestamps as the amount of the reused content. The content similarity engine 110 determines a size of the reference media content as displayed in a video frame, if the reference media content is reused as background media or foreground media, if any transformation (cropping, filtering, speed-up, speed-down, etc.) is applied to the reference media content, or a category (e.g., speech, remix, karaoke, movie introduction) of the reference media content, and the like. The determined amount and information regarding how the reference media content is reused provide a basis for determining whether or not a probe media should be flagged for removal as further provided below. The content similarity engine 110 associates the determined amount (e.g., a time interval) and/or information regarding how the reference media content is included in the probe media with the reused content as metadata. The content similarity engine 110 is capable of providing, for each pair of a probe media and an identified reference media content item, the probe media content item and associated metadata, the identified reference media content item and associated metadata, and the identified reused content and associated metadata to the removal evaluation engine 112 for further evaluation. A two-item set including a probe media and a reference media is referred to herein as "a pair" for clarity. For a given pair, metadata associated with the probe media content item, metadata associated with the identified reference media content item, and metadata associated with the identified reused content are collectively referred to herein as "metadata associated with the pair." The content similarity engine 110 can process a video simultaneously while it is being uploaded. The content similarity engine 110 can also process a video simultaneously when the ingest server 106 is processing the video.

The removal evaluation engine 112 evaluates whether or not to flag a probe media content item for removal. To evaluate whether or not a probe media content item should be flagged, the removal evaluation engine 112 evaluates an amount of reused content to a threshold amount. The threshold amount is selected according to characteristics associated with the pair. Example predetermined threshold amount can be, for example, a duration of 10 s (seconds), a duration of 20 s, a duration of 30 s, a duration of 40 s, and the like. The content hosting system 102 uses characteristics associated with a reference media content item and a probe media content item to determine the predetermined threshold amount on a probe by probe basis. Because there are many different ways of reusing a media content and the media content can be of various types, using threshold amounts adapted to various situations where media content of different types being reused in a variety of ways more accurately identifies probe media content items for removal, compared to using a fixed threshold amount.

The removal evaluation engine 112 can classify a pair into a reuse group, where each reuse group corresponds to a particular threshold amount for determining whether or not a probe media content item should be flagged for removal. The threshold amounts can generally (though not necessarily) differ between reuse groups. As further described below, the removal evaluation engine 112 analyzes the metadata associated with the pair to identify characteristics associated with the pair and classifies the pair into a reuse group based on the identified characteristics. A reuse group is selected from a predetermined reuse groups. Based at least on the reuse group into which the removal evaluation engine 112 classifies a pair, the removal evaluation engine 112 determines whether or not to flag a probe media content item for removal. The removal evaluation engine 112 compares an amount of reused content to a threshold amount associated with a confidence group to make a flagging determination.

For a given pair, the removal evaluation engine 112 can flag the probe media content item for removal, flag the probe media content item as accepted, or flag the pair for further evaluation. If the removal evaluation engine 112 flags a probe media content item for removal, the removal evaluation engine 112 can also report and/or remove the probe media from the content hosting system 102. If the removal evaluation engine 112 flags a pair for further evaluation, the removal evaluation engine 112 provides the probe media to an expert such as an owner of the reference media for further analysis. An expert can also input if a reference media or an identified reused content has invalid or potentially invalid copyright, access restrictions, and the like. If the removal evaluation engine 112 flags a probe media content item as accepted, the removal evaluation engine 112 stores the probe media content item or keeps the probe media content item stored in the content data store 116.

The removal evaluation engine 112 associates an evaluation result with each of the probe media and the reference media and stores the evaluation result in the removal flag data store 118. The removal evaluation engine 112 can associate with each reference media content item stored in the content data store 116 with a count of the number of times that its media content is identified as being included within other media, a count of the number of times its content was reused in probe media content items that are flagged for removal, and/or a count of the number of items its content was reused in probe media content items that are requested for removal. The removal evaluation engine 112 can associate with each probe media content item stored in the content data store 116 a count of the number of times that it is identified to include media content of another media, a count of the number of times it was flagged for removal, requested to be removed, or removed. It should be appreciated that the data processing operations of the content hosting system 102, as described herein, inherently require a programmed computer system for their practical implementation.

II. Removal Evaluation Engine

Figure 2:
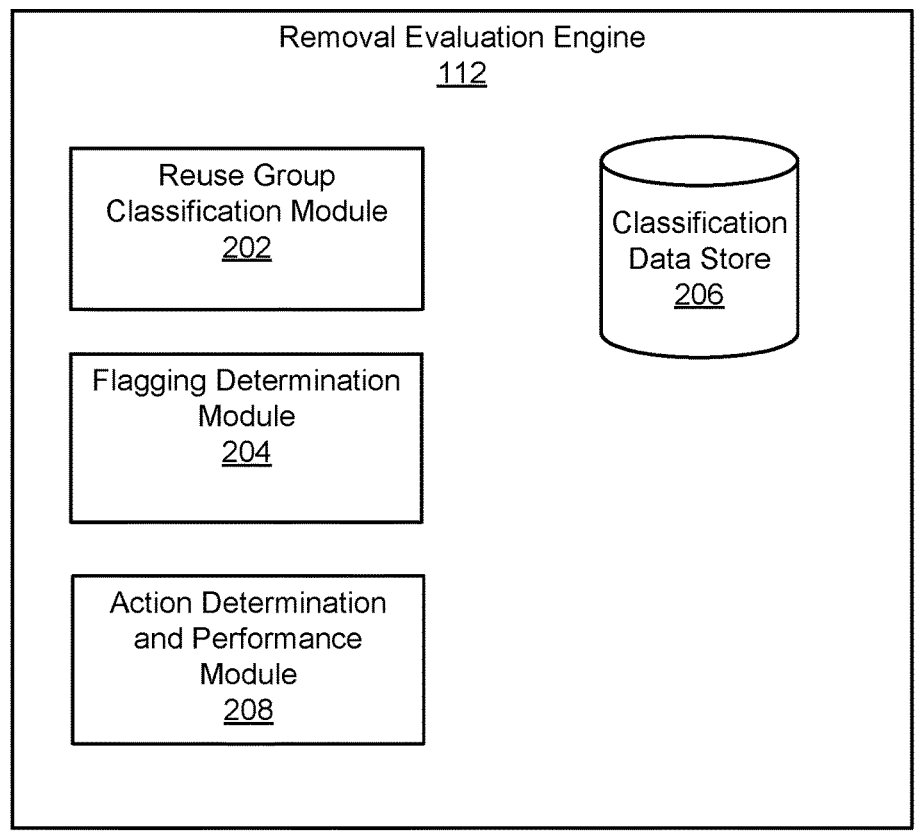
FIG. 2 is a high-level block diagram illustrating a detailed view of the similarity evaluation engine, according to one embodiment.

FIG. 2 is a high-level block diagram illustrating a detailed view of the removal evaluation engine 112, according to one embodiment. As shown in FIG. 2, the removal evaluation engine 112 includes several modules. Those of skill in the art will recognize that other embodiments can have different modules than the ones described here, and that the functionalities can be distributed among the modules in a different manner. In addition, the functions ascribed to the removal evaluation engine 112 can be performed by multiple engines. As illustrated, the removal evaluation engine 112 includes a reuse group classification module 202, a flagging determination module 204, a classification data store 206, and an action determination and performance module 208.

A. Reuse Group Classification Module

The reuse group classification module 202 classifies a pair of a probe media and a reference media into a reuse group based on received metadata associated with the pair. For any given pair of a probe media content item and a reference media content item, the removal evaluation engine 112 may use a different threshold amount of reuse to determine whether or not to label probe media content items for removal. The different threshold amounts of reuse correspond to each of a set of reuse groups. The reuse group classification module 202 classifies a pair into a reuse group based at least characteristics of the pair. The reuse groups into which the reuse group classification module 202 classifies the pairs can be predetermined in advance of the classification of any given pair. The threshold amount of reuse associated with each reuse group may be statically set, or dynamically updated.

By classifying different pairs into different reuse groups, the removal evaluation engine 112 can more accurately determine whether or not those pairs should be flagged for removal, particularly relative to system that uses only a single threshold regardless of the video in question.

The reuse group classification module 202 determines the characteristics of the pair by analyzing the metadata associated with the pair, metadata associated with the probe media, metadata associated with the reference media, metadata specifically associated with the reused media content between the probe and reference. The characteristics may be further determined based on how the reference media content is reused in the probe media, who the owner of the probe media is, and/or who the owner of the reference media is. Additionally or alternatively, the characteristics of the pair can be determined by other components of the content hosting system 102 applying various content analysis techniques to the media content itself, the metadata, or any other information used to determine the characteristics.

Examples of reuse groups include, but are not limited to, a normal reuse group, a less than normal reuse group, a more than normal reuse group, and a significant reuse group. Each reuse group indicates an amount of information the removal evaluation engine 112 requires to determine whether or not a probe media content item should be flagged for removal. The normal reuse group can be set as the default group into which a pair is classified. That is, if a given pair has no metadata including characteristics that meet the specific thresholds of any other reuse groups as described further below, the reuse group classification module 202 classifies the pair into the normal reuse group.

Pairs that are classified into the more than normal reuse group have characteristics that indicate that more than an "normal" amount of information required to determine whether or not a probe media content item should be flagged for removal, where what constitutes "normal" may be specified by the implementer. As one example, for a given pair, the reuse group classification module 202 classifies the pair into the more than normal reuse group if metadata associated with the pair indicates that the reference media content or probe media content item is of bad quality. While the implementer may decide what represents bad quality, as an example bad quality can be determined based on a ratio between secondary interfering content and primary content in a video. In one embodiment, if the ratio exceeds a threshold, the pair is marked as having bad quality.

Secondary interfering content, broadly described, interferes with the system's 102 ability to determine whether or not the primary content matches the probe media content item of the pair. An example secondary interfering content may be noise or other non-content data in media content that may, for example, appear as distorted colors in a video. In one specific embodiment, the ratio of secondary interfering content to primary content is determined by calculating a signal to noise ratio for one or more of the reference or probe media content item. As another embodiment, metadata can inform the bad quality decision. For instance, if a pair includes a media item where the metadata indicates that the media item is of a "broadcast" type (e.g., a television series), then the pair can be classified into the more than normal reuse group on the assumption that broadcasted media content can include a substantial amount of commercials, which for purpose of this example can be treated as secondary interfering content.

As another example, for a given pair, the reuse group classification module 202 can classify the pair into the more than normal reuse group if metadata associated with the pair indicates that the reference media or probe media is "ambiguous." For purposes of this description, "ambiguous" media content is media content that is repetitive and/or indistinct over a duration of the media content, such different time segments of the media content are very similar to both the user and/or any components of the system 102 analyzing that media content for the purposes described herein. Ambiguity can be determined either by analyzing the media content itself, or by evaluating the metadata of the pair. For example, if a pair that includes a media content of which metadata indicates that it is of a particular genre known to include repetitive or indistinct content (e.g., techno music, hip hop beats), then the pair can be classified into the more than normal reuse group.

Similarly, if the metadata associated with the pair indicates that a probe media (or at least a portion of the probe media that includes reference media content) uploaded by a user includes that user's own work (e.g., a user's comments, a user's reactions, a user's voice, a user's alteration, etc.), then the pair is classified into the more than normal reuse group. The presence of a user's own work is a mitigating fact that may prevent a probe media content item from being removed. For example, if metadata associated with a probe media indicates that it is of a reaction video type (e.g., including a user's voiceover reactions to a movie) where the reference media that is reused is only present in a small portion of a video frame and the rest of the video frame includes the user's own work, the removal evaluation engine 112 classifies the given pair into the more than normal reuse group. As another example, if a probe media (or at least a portion that includes reference media content) is of karaoke type where the probe media includes a user's voiceover along with the reference media (e.g., melody), the reuse group classification module 202 classifies the given pair into the more than normal reuse group. As a further example, if the metadata associated with the pair indicates that the probe media includes reference media content in an altered form, the reuse group classification module 202 classifies the given pair into the more than normal reuse group. For instance, if a probe media (or at least a portion that includes reference media content) is of remix type (e.g., a media altered from its original form by adding, removing, and/or changing pieces of the media) where the reference media has been altered from its original state, then the reuse group classification module 202 classifies the given pair into the more than normal reuse group.

The pair is classified into the more than normal reuse group, if the metadata associated with the pair indicates that the probe media (or at least a portion of the probe media that includes reference media content) includes content that appears frequently in other media content items. This may be determined based on the presence of an item of metadata meant to denote the probe video as being a of a particular type known to include commonly repeated content. For example, if metadata associated with the probe media content item indicates that it is of a "movie introduction" type where video frames including production logos (e.g., a logo to identify a production company or to identify a distributor of a media content item) or other content that often appear in the beginning of or at the end of movies, TVs, video games, and the like, the given pair is classified into the more than normal reuse group. This example assumes a metadata field where one value for that field can be set to the value of "movie introduction."

The pair is classified into the more than normal reuse group, if metadata associated with the probe media content item indicates that the probe media content (or at least a portion of the probe media that includes reference media content) appears to be very similar to other media content in a short duration. For instance, if metadata associated with the probe media indicates that it is of a speech type or includes speeches, then the given pair is classified into the more than normal group, because different speeches are less distinct and can appear to be very similar in a short duration.

Pairs that are classified into the less than normal reuse group have characteristics where a less than normal amount of information is sufficient for the system 102 to determine whether or not to a probe media content item should be flagged for removal. As one example, for a given pair, the reuse group classification module 202 classifies the pair into the less than normal group if metadata associated with the reference media specifies that the reference media is associated with a production labels (e.g., a brand associated with marketing of media content items, such as a movie studio)) or otherwise indicates that the reference media is of high value, and therefore that a smaller amount of reuse will trigger flagging for removal. For example, owners of reference media may specify that newly-released movies are of high value. As another example, if metadata associated with the reference media content item indicates that its content that is "unambiguous" (e.g., non-repetitive, distinct, as contrasted with "ambiguous" content as described above), then the reuse group classification module 202 classifies the pair into the less than normal group, because reuse of a short segment of a reference media content item includes sufficient information for the removal evaluation engine 112 to determine whether or not a probe media content item should be flagged for removal. As a further example, if metadata associated with a pair indicates that a transformation (e.g., speed-up, cropping, etc.) has been applied to the probe media content, then the reuse group classification module 202 classifies the pair into the less normal group, under the assumption that the transformation was applied to the probe media to avoid being removed by the removal evaluation engine 112.

Pairs that are classified into the significant reuse group have characteristics where substantially more than a normal amount of information is analyzed to determine whether or not a probe media content item should be flagged for removal. For a given pair, the reuse group classification module 202 classifies the pair into the significant reuse group if metadata associated with the pair indicates that the reference media includes reference media content that is frequently reused in probe media content items that are flagged for removal, requested to be removed, and/or removed. This helps prevent over-flagging of consistently reused reference media content. For example, if a count of the number of times its reference media content was reused in media content items that are flagged for removal, requested to be removed, and/or removed is greater than a threshold, then the pair is classified into the significant reuse group. Another example is if metadata associated with a pair indicates that the reference media or the reused media content is identified as having invalid or potentially invalid copyright, access restrictions, and the like, then the reuse group classification module 202 classifies the pair into the significant reuse group, because a reuse of the reference media content does not warrant the probe media content item for removal.

The reuse group classification module 202 classifies a pair into the significant reuse group if metadata associated with the pair indicates that the probe media is created based on templates. Metadata associated with the probe media can indicate that the probe media includes template elements that are used to create media content items. Media content items created by using templates can appear similar simply because the frames of those videos may include visible-to-the user template elements, and thus the removal evaluation engine 112 requires the most amount of information to determine whether or not a probe media content item should be labeled for removal. Further, media items created using a template can appear to be very similar even beyond any co-occurring template elements.

The reuse group classification module 202 classifies a pair into the significant reuse group if metadata associated with the pair indicates that reference media content is reused in a particular manner in the probe media, such as background music. For these pairs, a reuse of reference media content does not warrant flagging the probe media content item for removal, and thus the removal evaluation engine 112 requires a significant amount of information to determine whether or not a probe media content item should be labeled for removal.

The reuse group classification module 202 classifies a pair into the significant reuse group if metadata associated with the pair indicates that metadata associated with the pair indicates that the probe media includes an extended amount (e.g., over 5 mins) of reference media content and is uploaded by a user with good reputation or included in a channel with good reputation. This is because the metadata includes conflicting information for determining whether or not a probe media content item should be removed and the reuse group classification module 202 requires additional information to make the determination. A user or a channel has good reputation if the user's or the channel's reputation measure is greater than a threshold.

Additionally, the reuse group classification module 202 classifies a pair into the significant reuse group if metadata associated with the pair indicates that the probe media is uploaded some time (e.g., a few months) before the reference media. This is because the later-uploaded reference media can likely include media content such as production music owned by music libraries, and the probe media's inclusion does not warrant flagging the probe media for removal.

When a pair has characteristics such that it can be classified into multiple reuse groups, the reuse classification module 202 classifies the pair into one specific reuse group according to rules that can vary by implementation. When the pair is associated with characteristics associated with conflicting amounts of information to determine whether or not a probe media content item should be flagged for removal, the reuse classification module 202 reconciles the inconsistency over time thereby to improve the accuracy in classifying pairs of media content items having multiple characteristics. In one embodiment, the pair is classified into the reuse group corresponding to a significant amount of information required to determine whether or not a probe media content item should be flagged for removal. For example, if a reference media includes techno music and a probe media includes templates, the pair is classified into the significant reuse group as chosen between the significant reuse group and the more than normal reuse group.

The reuse group classification module 202 associates with a pair the classified reuse group and stores the classified reuse group in the classification data store 212. The reuse group classification module 202 can adjust the correlations between reuse groups and metadata associated with pairs, for example, based on experts' input. An expert is a trained professional employed to analyze probe and reference media content items and provide input as to whether or not probe media content items should be flagged for removal. For example, an expert can override a classification of a pair determined by the removal evaluation engine 112, and the reuse group classification module 202 increase the amount of information required to determine whether or not a probe media content item should be removed accordingly. Conversely, when an expert confirms a classification determined by the removal evaluation engine 112, the reuse group classification module 202 decreases the amount of information required. When the amount of information required is adjusted such that it reaches a threshold amount for a different reuse group, the reuse group classification module 202 updates the correlation such that the metadata including the one or more characteristics are being correlated to the new reuse group.

As further described below, the removal evaluation engine 112 can determine that it cannot confidently determine whether or not a probe media content item should be flagged for removal. After receiving an input from an expert as to whether or not a probe media content item should be flagged for removal, the reuse group classification module 202 analyzes characteristics of the pair, and adjusts the reuse group classification module's logic to adjust the amount of information used to determine the correlations between reuse groups and pairs of media content items having particular characteristics. For example, the reuse group classification module 202 can predict a reuse group and the flagging determination module 204 can determine whether or not a probe media content item should be flagged for removal using the predicted reuse group. If the predicted determination matches the input determination provide by an expert, then the reuse group classification module 202 decrease the amount of information required to determine whether or not a probe media content item that is included in a pair having the characteristics should be removed, for example, by an adjustment amount. If the predicted determination differs from the input determination provided by an expert, then the reuse group classification module 202 change the amount of information required to determine whether or not a probe media content item that is included in a pair having the characteristics should be removed, for example, by an adjustment amount. For example, in the case of determining whether or not a media item is of "bad quality," this process may resulting in adjusting the ratio for determining whether a video is of bad quality.

The reuse group classification module 202 provides a pair of a probe media and a reference media along with the classified reuse group to the flagging determination module 204 for further analysis. As further described below, different threshold amounts associated with different reuse groups are used to evaluate pairs that are classified into the different reuse groups to determine whether or not a probe media content item should be flagged for removal. This is because pairs that are classified into different reuse groups have different characteristics that provide information regarding whether amounts of reused content support a probe media content item being flagged for removal.

B. Flagging Determination Module

The flagging determination module 204 determines whether or not a probe media content item of a pair should be flagged for removal based at least on a reuse group into which the pair is classified. The flagging determination module 204 can also consider an amount of reused content when determining whether or not a probe media content item should be flagged for removal. The flagging determination module 204 flags a probe media content item for removal or flags a pair for further evaluation, for example, by experts.

The flagging determination module 204 compares an amount of reused content to the thresholds amount of reuse associated with the reuse group to which a pair is assigned to determine whether or not a probe media content item should be flagged for removal. For example, for a given pair that is classified into the significant reuse group, the flagging determination module 204 flags the pair for further evaluation based on the threshold set for the significant reuse group (e.g., using 100% reuse as the threshold).

For a given pair that is classified into the normal reuse group, the flagging determination module 204 compares a duration of reused content to a first threshold (e.g., 20 s). The probe media content item is flagged for removal if the duration of reused content is at least the first threshold. The probe media content item is not flagged for removal (e.g., it may be alternatively as accepted for uploading to the content hosting system 102) if the duration is less than the first threshold.

For a given pair that is classified into the less than normal reuse group, the flagging determination module 204 compares a duration of reused content to a second threshold (e.g., 10$s$). The probe media content item is flagged for removal if the duration is at least the second threshold. The pair is flagged for further evaluation if the duration is less than the second threshold. For a given pair that is classified into the more than normal confident group, the flagging determination module 204 compares a duration of reused content to a third threshold (e.g., 30 s). The probe media content item is flagged for removal if the duration is at least the third threshold. The given pair is flagged for further evaluation if the duration is less than the third threshold.

Once the flagging determination module 204 has determined whether or not to flag a probe media content item or to flag a pair, the flagging determination module 204 stores the flagging determination in the classification data store 212. In one embodiment, the reuse group classification module 202 and the flagging determination module 204 employ machine learning techniques to develop one or more machine learned models that include model parameters that determine the correlations of whether or not a probe media content item should be flagged for removal to metadata associated with pairs. The machine learned models are developed by using training data including a set of input and reference media pairs labeled with whether or not probe media content items should be flagged for removal.

The flagging determination module 204 provides a pair of a probe media and a reference media and the classified likelihood to the action determination and performance module 208.

C. Action Determination and Performance Module

The action determination and performance module 208 (also referred to as the action module 208 for clarity) determines and takes an action with respect to the probe media. The types of actions that can be taken can vary by implementation, as well as based on the flagging of a probe media content item or the flagging of a pair. For example, for a probe media content item that is flagged for removal, the action module 208 can act to prevent users from accessing the probe media. The action module 208 can remove the probe media content item. Alternatively, the action module 208 can also report to the owner of the reference media that the probe media content item reuses reference media content and should be removed. In response to the owner's instruction, the action module 208 removes the probe media content item. A user can also request to remove a media content item.

For a given pair of which the probe media is flagged as accepted, the action module 208 stores the probe media in the content data store 116 or keeps the probe media stored in the content data store 116. For a given pair that is flagged for further evaluation, the action determination module 208 provides the probe media to an expert for evaluation. When awaiting the expert's input, the action determination module 208 can prevent users from accessing the probe media. The action determination module 208 can also allow users to access the probe media until the expert instructs that the probe media content item should be removed.

III. Process of Evaluating Requests for Removal

Figure 4:
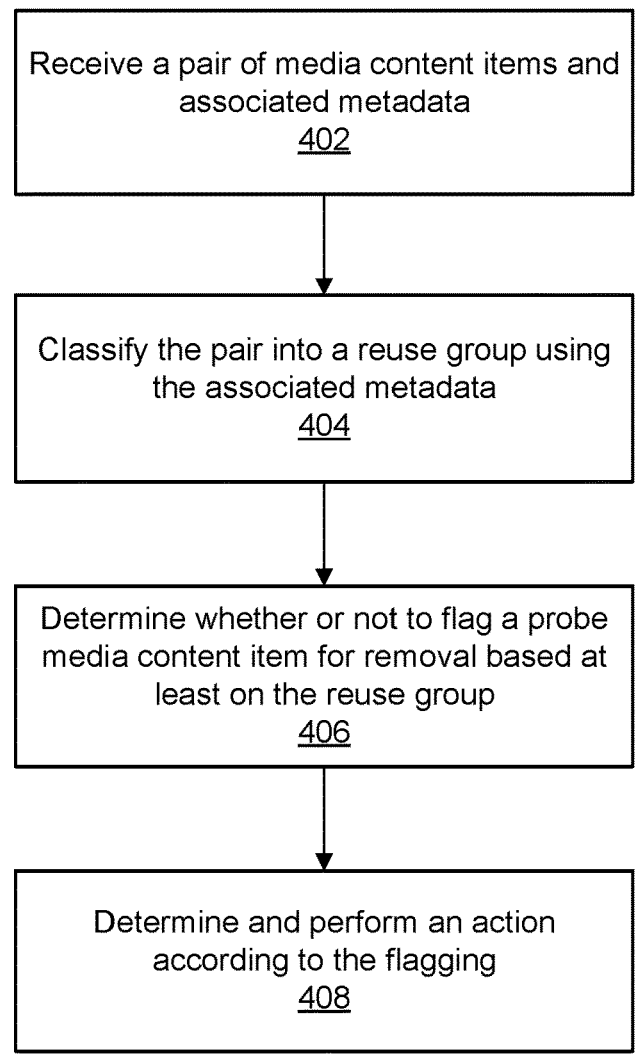
FIG. 4 illustrates a flow chart of an example process of evaluating media content items that reuse media content of other media content items, according to one embodiment.

FIG. 4 illustrates a flow chart of an example process of determining whether or not a probe media content should be flagged for removal, according to one embodiment. The content hosting system 102 receives 402 a pair of media content items including a probe media content item and a reference media content item and metadata associated with the pair of media content items. The probe media content item is identified to include reference media content of the reference media content item. The reference media content can be copyright protected, owned or created by another entity, access restricted, or otherwise noteworthy. The metadata associated with the pair includes metadata of the probe media content item, metadata of the reference media content item, and metadata of the reused content. The metadata includes one or more characteristics of the probe media content item, the reference media content item, the reused content, an owner of the probe media content item, and/or an owner of the reference media content item.

The content hosting system 102 identifies the reference media content item of which the probe media content item includes a portion of the reference media content. The content hosting system 102 matches a portion of probe media content against reference media content to identify the reference media content item. For example, the content hosting system 102 matches characteristics associated with the portion of probe media content against characteristics associated with the reference media content. In one embodiment, the content hosting system 102 matches probe fingerprints (e.g., vectors) generated for the probe media content item against reference fingerprints of reference media content items to identify the reference media content item. For example, a match is identified when a distance between two vectors is less than a predetermined threshold. The fingerprints represent media content such as video and/or audio content of a media content item.

The content hosting system 102 determines a duration of reused content included by the probe media content item as well as information regarding how the reference media content is reused in the probe media content item. For example, the content hosting system 102 determines a size of the reused content as displayed in a video frame, if the reused content is included as background media or foreground media, if any transformation (cropping, filtering, speed-up, speed-down, etc.) is applied, or a category (e.g., speech, remix, karaoke, movie introduction) of the reference media content, and the like. The content hosting system 102 associates the determined duration and/or information with the identified reference media content item as metadata. The content hosting system 102 analyzes the determine duration of reused content, the determined information regarding how the reference media content is reused in the probe media content item, metadata associated with the reference media content item, and metadata associated with the probe media content item to determine whether or not a probe media content item should be flagged for removal.

The content hosting system 102 classifies the pair into a reuse group using metadata associated with the pair. Different reuse groups correspond to different threshold amounts of reused content for determining whether or not probe media items should be flagged for removal where different reuse groups are correlated to metadata associated with pairs that include different characteristics of the pairs. In particular, the content hosting system 102 analyzes the metadata to identify characteristics of a pair and classifies the pair into the reuse group based on the identified characteristics of the pair. A reuse group is selected from a set of predetermined reuse groups and is associated with a threshold amount for determining whether or not a probe media content item should be flagged for removal.

In one embodiment, the reuse groups include an normal reuse group, a less than normal reuse group, a more than normal reuse group, and a significant reuse group. The content hosting system 102 classifies a pair into one specific reuse group when a pair is associated with metadata including characteristics correlated to different reuse groups, where the characteristics are correlated to the different reuse groups can vary by implementation and based on which reuse groups the implementer decides to implement. The normal confident group can be set as the default group into which a pair of input and reference media is classified. The pair is classified into the more than normal reuse group if metadata associated with the pair includes that the reference media content is of bad quality (e.g., a SNR ratio is low, a broadcaster type) that includes a substantial amount of secondary interfering media content, is ambiguous (e.g., of a particular genre (e.g., techno music, hip hop beats)) that can be repetitive and indistinct, or includes static content that is greater than a threshold, and the like. The pair is classified into the less than normal reuse group if metadata associated with the pair indicates that the reused reference media content occupies a small portion of video frames (e.g., reaction videos), the probe media content item includes original work (e.g., reaction videos, karaoke, etc.), the probe media content item includes reference media content in an altered form (e.g., remixes), or that the probe media content (or at least a portion that includes reference media content) appears to be very similar to other media content in a short duration (e.g., karaoke, movie introduction, remixes, speeches), and the like.

The pair is classified into the less than normal reuse group if metadata associated with the pair indicates that the reference media is associated with production labels or that the reference media is of high value.

The pair is classified into the significant reuse group if metadata associated with the pair indicates that the reference media content item includes media content that is frequently reused in probe media content items that are flagged for removal, requested to be removed, or removed, or that the reference media or the source reference media is identified as having invalid or potentially invalid copyright, access restrictions. If metadata associated with a pair indicates that the probe media is uploaded some time (e.g., a few months) before the reference media, that the probe media content item includes template elements, includes reference media content as background media (e.g., background music), includes an extended amount (e.g., over 5 mins) of reference media content and is uploaded by a user with good reputation, or includes an extended amount (e.g., over 5 mins) of reference media and is included in a channel with good reputation, then the pair is classified into the significant reuse group.

The content hosting system 102 determines 406 whether or not to flag a probe media content item for removal based at least on the reuse group. The content hosting system 102 compares an amount of reused content to a threshold amount associated with the reuse group to determine whether or not a probe media content item should be removed for removal. The content hosting system 120 can determine to flag a probe media content item for removal, to flag a media content item as accepted, or flag a pair for further evaluation.

The content hosting system 102 determines and performs an action based at least on the flagging of a probe media content item or the flagging of a pair. For example, if a probe media content item is flagged for removal, the content hosting system 102 does not provide users with access to the probe media content item. The content hosting system 102 can report to the owner of the reference media that the probe media content item is flagged for removal. The content hosting system 102 can remove the probe media content item from the content data store 116 automatically or in response to an instruction from a user such as the owner of the reference media content item. If the probe media content item is flagged as accepted, the content hosting system 102 stores the probe media content item in the content data store 116 or keeps the probe media content item stored in the content data store 116. If a pair is flagged for further evaluation, the content hosting system 102 provides the probe media to an expert such as the owner of the reference media for evaluation. An expert (e.g., an owner of reference media content) can override a decision of flagging a probe media content item for removal made by the content hosting system 102.

The content hosting system 102 adjusts the correlations between reuse groups and metadata associated with pairs, for example, based on experts' input. Each time an expert overrides a decision of flagging a probe media content item for removal, the content hosting system 102 increases the threshold amount for determining whether or not a probe media content item should be flagged for removal that is included in a pair associated with metadata including particular characteristics accordingly. Likewise, each time an expert confirms a decision of flagging a probe media content item for removal, the content hosting system 120 decreases the threshold amount.

IV. Additional Considerations

Some portions of the above description present the feature of the present invention in terms of algorithms and symbolic representations of operations on information. These algorithmic descriptions and representations are the means used by those skilled in the arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the required method steps. The required structure for a variety of these systems will appear from the description above. In addition, the present invention is not described with reference to any particular programming language. It is appreciated that a variety of programming languages can be used to implement the teachings of the present invention as described herein, and any references to specific languages are provided for disclosure of enablement and best mode of the present invention.

Finally, it should be noted that the language used in the specification has been principally selected for readability and instructional purposes, and cannot have been selected to delineate or circumscribe the inventive subject matter.

Accordingly, the disclosure of the present invention is intended to be illustrative, but not limiting, of the scope of the invention.

What is claimed is:

1. A method, comprising:
   determining whether a similarity value between characteristics of a portion of a probe media content item and characteristics of a portion of a reference media content of a reference media content item exceeds a threshold, wherein the threshold depends on the characteristics of the portion of the probe media content item and the characteristics of the portion of the reference media content;
   in response to determining that the similarity value exceeds the threshold, determining that the probe media content item includes the portion of reference media content of the reference media content item;
   upon determining that the probe media content item includes the portion of the reference media content, receiving a pair of media content items comprising the probe media content item and the reference media content item;
   receiving metadata associated with the pair, the metadata associated with the pair providing information about the probe media content item, the reference media content item, and the portion of reference media content reused in the probe media content;
   classifying the pair into a reuse group of a plurality of reuse groups based on the metadata associated with the pair, each of the plurality of reuse groups associated with a corresponding amount of reuse different from other reuse groups, the corresponding amount of reuse used for determining whether or not the probe media content item is to be flagged for removal;
   comparing a first amount of the portion of reference media content to a second amount of reuse associated with the reuse group into which the pair is classified; and
   responsive to the first amount of the portion of reference media content being greater than the second amount of reuse associated with the reuse group, flagging the probe media content item for removal.

2. The method of claim 1, further comprising:
   in response to the first amount of the portion of reference media content being less than the second amount of reuse associated with the reuse group, providing the pair to an expert for manual analysis;
   receiving, from the expert, an input regarding whether or not to flag the probe media content item for removal; and
   responsive to the input indicating to flag the probe media content item for removal, flagging the probe media content item for removal.

3. The method of claim 2, further comprising: responsive to determining that the first amount of the portion of reference media content is less than the second amount, flagging the pair for further evaluation.

4. The method of claim 1, wherein the metadata associated with the pair comprises at least one of:
   metadata associated with the probe media content item that provides information about the probe media content item,
   metadata associated with the reference media content item that provides information about the reference media content item, or
   metadata associated with the portion of reference media content that provides information about the portion of reference media content.

5. The method of claim 1, further comprising responsive to determining the first amount of the portion of reference media content is less than the second amount, flagging the probe media content item as accepted.

6. The method of claim 1, further comprising responsive to determining the first amount of the portion of reference media content is at least the second amount, flagging the probe media content item for removal.

7. The method of claim 1, wherein the classifying the pair into a reuse group comprises:
   selecting the reuse group from a set of predetermined reuse groups of the plurality of reuse groups based on at least one of a characteristic associated with an owner of the probe media content item, or a characteristic associated with an owner of the reference media content item.

8. The method of claim 7, wherein the set of predetermined reuse groups comprises a normal reuse group associated with the second amount, a less than normal reuse group associated with a third amount, a more than normal reuse group associated with a fourth amount, and a significant reuse group associated with a fifth amount, the fifth amount greater than the fourth amount greater than the second amount greater than the third amount.

9. The method of claim 1, wherein the reuse group into which the pair is classified comprises a more than normal reuse group and the metadata includes at least one characteristic selected from a group consisting of:
   the reference media content item being a broadcaster type, the reference media content item including ambiguous content, the reference media content item including static content greater than a static content threshold, and
   the portion of reference media content occupying a portion of a video frame less than a threshold portion.

10. The method of claim 1, wherein the reuse group into which the pair is classified is a more than normal reuse group and the metadata includes at least one characteristic selected from a group consisting of:
    the probe media content item including original work, and
    the probe media content item comprising karaoke, movie introduction, remixes or speeches.

11. The method of claim 1, wherein the reuse group into which the pair is classified is a lower than normal reuse group and the metadata includes at least one characteristic selected from a group consisting of:
    the reference media content being associated with a production label, and the reference media content being of a high value to an owner of the reference media content item.

12. The method of claim 1, wherein the reuse group into which the pair is classified is a significant reuse group and the metadata includes at least one characteristic selected from a group consisting of:
    the reference media content item comprising reference media content associated with a quantity of a number of times the reference media content was reused in probe media content items flagged for removal, requested to be removed, or removed greater than a threshold,
    the reference media content item associated with invalid access restrictions, the portion of reference media content associated with invalid access restrictions, the probe media content item associated with a first time point being a predetermined time earlier than a second time point associated with the reference media content item, the probe media content item including a template, the probe media content item using the reference media content as background music, the probe media content item being uploaded by a user with good reputation and the portion of reference media content greater than a threshold duration, and the probe media content item being included in a channel with good reputation and the portion of reference media content greater than a threshold duration.

13. The method of claim 1, further comprising:
matching the portion of probe media content of the probe media content item against reference media content of the reference media content item; and
responsive to the matching, designating the probe media content and the reference media content as a pair.

14. A system comprising:
a computer processor; and
a non-transitory computer-readable storage medium storing computer executable components configured to cause the computer processor to perform:
determining whether a similarity value between characteristics of a portion of a probe media content item and characteristics of a portion of a reference media content of a reference media content item exceeds a threshold, wherein the threshold depends on the characteristics of the portion of the probe media content item and the characteristics of the portion of the reference media content;
in response to determining that the similarity value exceeds the threshold, determining that the probe media content item includes the portion of reference media content of the reference media content item;
upon determining that the probe media content item includes the portion of the reference media content, receiving a pair of media content items comprising the probe media content item and the reference media content item;
receiving metadata associated with the pair, the metadata associated with the pair providing information about the probe media content item, the reference media content item, and the portion of reference media content reused in the probe media content;
classifying the pair into a reuse group of a plurality of reuse groups based on the metadata associated with the pair, each of the plurality of reuse groups associated with a corresponding amount of reuse different from other reuse groups, the corresponding amount of reuse used for determining whether or not the probe media content item is to be flagged for removal;
comparing first amount of the portion of reference media content to a second amount of reuse associated with the reuse group into which the pair is classified; and
responsive to the first amount of the portion of reference media content being greater than the second amount of reuse associated with the reuse group, flagging the probe media content item for removal.

15. The system of claim 14, wherein the computer executable components are configured to cause the computer processor to further perform:
in response to the first amount of the portion of reference media content being less than the second amount of reuse associated with the reuse group, providing the pair to an expert for manual analysis;

receiving, from the expert, an input regarding whether or not to flag the probe media content item for removal; and
responsive to the input indicating to flag the probe media content item for removal, flagging the probe media content item for removal.

16. The system of claim 15, further comprising: responsive to determining that the first amount of the portion of reference media content is less than the second amount, flagging the pair for further evaluation.

17. The system of claim 14, wherein the metadata associated with the pair comprises at least one of:
metadata associated with the probe media content item that provides information about the probe media content item,
metadata associated with the reference media content item that provides information about the reference media content item, or
metadata associated with the portion of reference media content that provides information about the portion of reference media content.

18. The system of claim 14, wherein the classifying the pair into a reuse group comprises:
selecting the reuse group from a set of predetermined reuse groups of the plurality of reuse groups based on at least one of a characteristic associated with an owner of the probe media content item, or a characteristic associated with an owner of the reference media content item.

19. The system of claim 18, the set of predetermined reuse groups comprises a normal reuse group associated with the second amount, a less than normal reuse group associated with a third amount, a more than normal reuse group associated with a fourth amount, and a significant reuse group associated with a fifth amount, the fifth amount greater than the fourth amount greater than the second amount greater than the third amount.

20. A non-transitory computer-readable medium having instructions stored thereon that, in response to execution, cause a system including a processor to perform steps comprising:
determining whether a similarity value between characteristics of a portion of a probe media content item and characteristics of a portion of a reference media content of a reference media content item exceeds a threshold wherein the threshold depends on the characteristics of the portion of the probe media content item and the characteristics of the portion of the reference media content;
in response to determining that the similarity value exceeds the threshold, determining that the probe media content item includes the portion of reference media content of the reference media content item;
upon determining that the probe media content item includes the portion of the reference media content, receiving a pair of media content items comprising the probe media content item and the reference media content item;
receiving metadata associated with the pair, the metadata associated with the pair providing information about the probe media content item, the reference media content item, and the portion of reference media content reused in the probe media content;
classifying the pair into a reuse group of a plurality of reuse groups based on the metadata associated with the pair, each of the plurality of reuse groups associated with a corresponding amount of reuse different from other reuse groups, the corresponding amount of reuse used for determining whether or not the probe media content item is to be flagged for removal;

comparing first amount of the portion of reference media content to a second amount of reuse associated with the reuse group into which the pair is classified; and responsive to the first amount of the portion of reference media content greater than the second amount of reuse associated with the reuse group, flagging the probe media content item for removal.

* * * * *